United States Patent [19]
Kelly

[11] Patent Number: 6,016,465
[45] Date of Patent: Jan. 18, 2000

[54] SENSOR FAULT DETECTION SYSTEM

[75] Inventor: Ronald W Kelly, Farnborough, United Kingdom

[73] Assignee: The Secretary of State for Defence, Farnborough, United Kingdom

[21] Appl. No.: 09/005,547

[22] Filed: Jan. 12, 1998

Related U.S. Application Data

[63] Continuation of application No. PCT/GB96/01596, Jul. 4, 1996.

[30] Foreign Application Priority Data

Jul. 10, 1995 [GB] United Kingdom ............... 9514008

[51] Int. Cl.[7] ............................... G05B 9/02; G06F 7/00
[52] U.S. Cl. ........................... 702/116; 702/60; 702/179; 702/189; 702/191; 376/215
[58] Field of Search ............................. 702/116, 60–69, 702/179, 189, 191, 193, 195; 376/215–217; 345/914, 915

[56] References Cited

U.S. PATENT DOCUMENTS 5,459,675   10/1995   Gross et al. .................. 376/215

FOREIGN PATENT DOCUMENTS

B00 481 971   9/1983   European Pat. Off. .
93/06537       4/1993   WIPO .
94 28557      12/1994   WIPO .

*Primary Examiner*—Kamini Shah
*Attorney, Agent, or Firm*—Nixon & Vanderhye P.C.

[57] ABSTRACT

The sensor fault detector is one in which each sensor signal is compared with a reference signal provided by e.g. a model of the system being monitored. Prior art sensor fault detectors subtract the output of the sensor and the corresponding reference signal from each other, and a fault is declared when the residual difference exceeds a prescribed threshold. However, modelling errors (such as scaling discrepancies), d.c bias and noise mean that faults are often wrongly declared, or alternatively that only large faults can be detected. These problems are overcome according to the invention by comparing the "shape" of the sensor signal with that of the corresponding reference signal (i.e. comparing the signal outlines) over a finite time window, using e.g. correlation techniques. A fault is declared when the shapes differ by a prescribed amount.

8 Claims, 6 Drawing Sheets

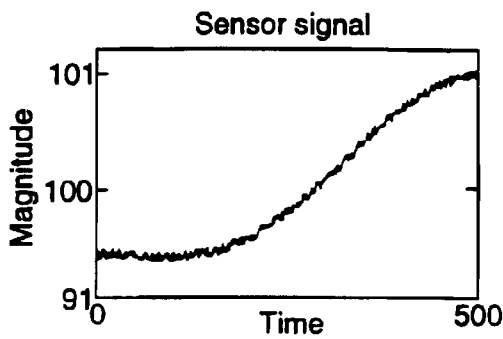
Fig.(2a).
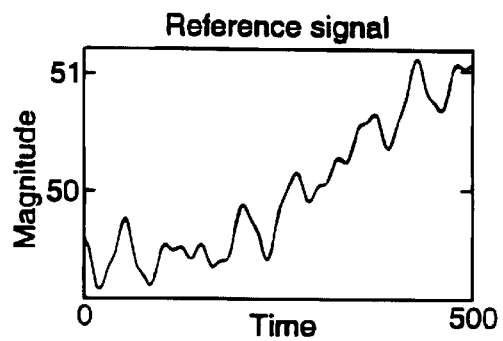
Fig.(2b).
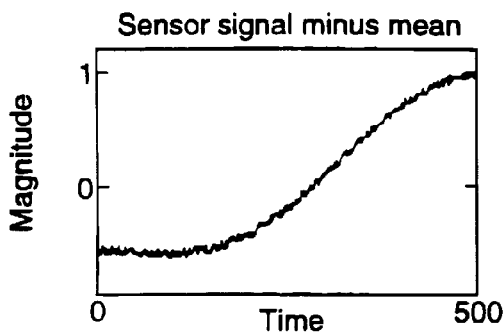
Fig.(2c).
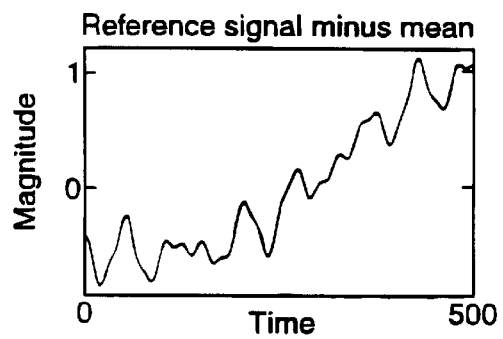
Fig.(2d).
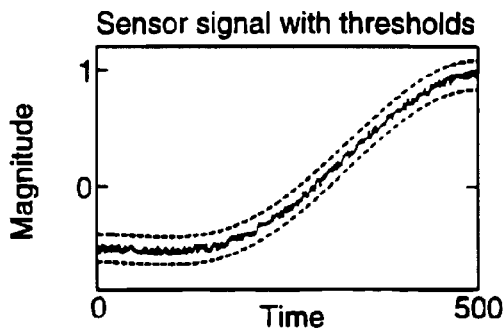
Fig.(2e).
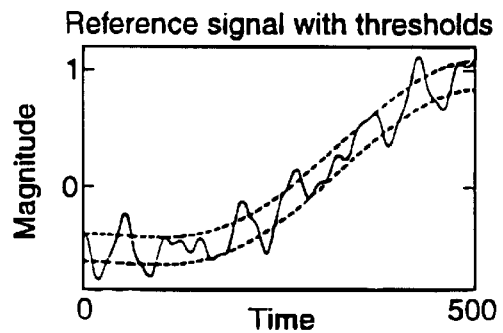
Fig.(2f).
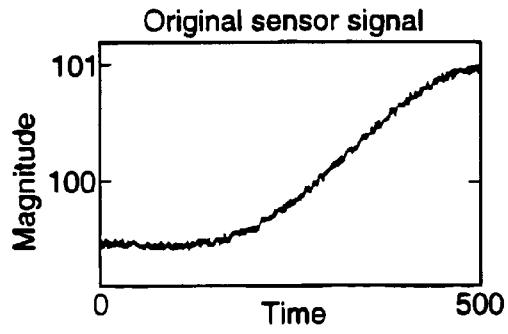
Fig.(2g).
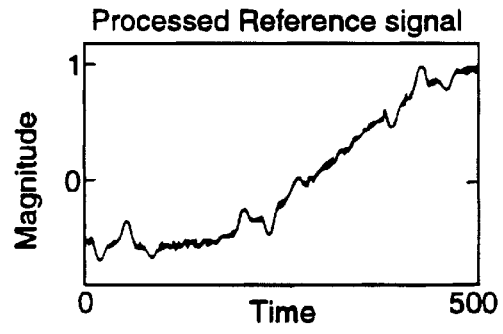
Fig.(2h).

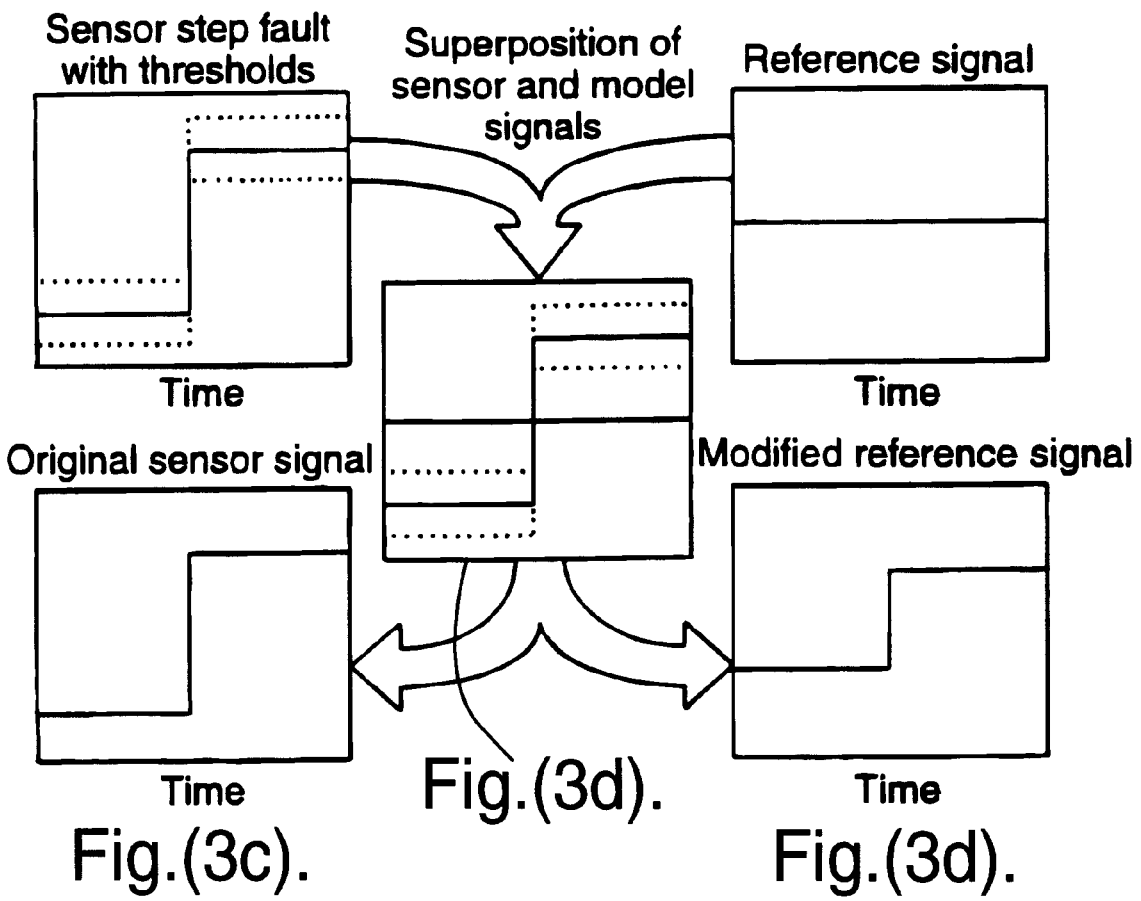

Fig.(4a). Sensor step fault with thresholds
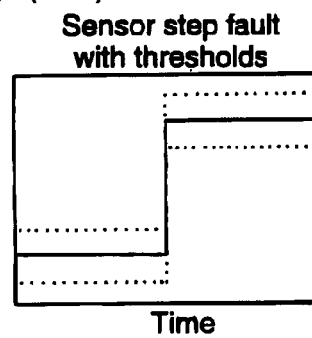
Time

Fig.(4b). Reference signal with dither signal
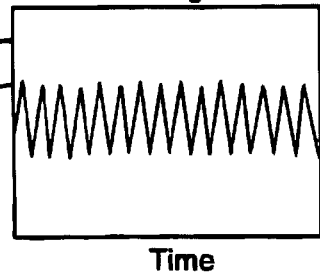
Time

Calculate areas

Fig.(4c). Area of sensor signal
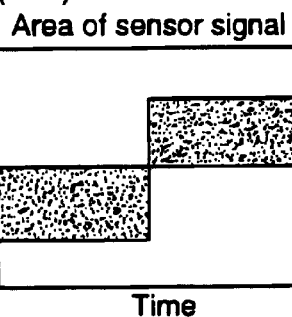
Time

Fig.(4d). Area of reference signal
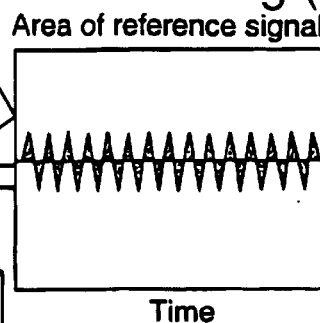
Time scale the signal with the smallest area by the ratio of the largest area to smallest area Fig.(4e). Sensor step fault with thresholds
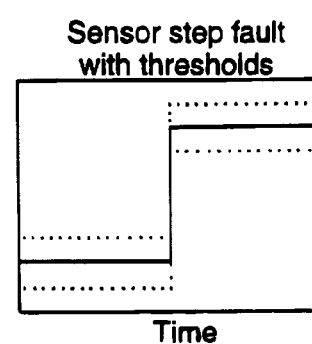
Time Fig.(4f). Scaled reference signal
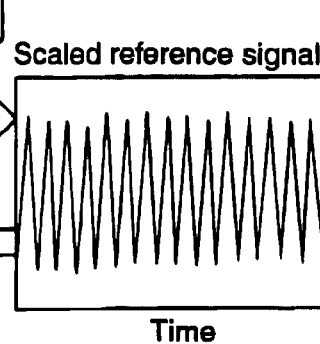
Time Superposition of sensor and model signals Fig.(4g). 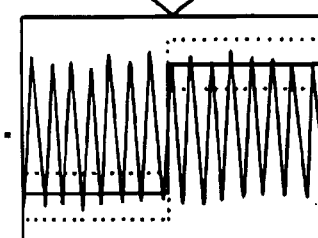

Fig.(4h). Original sensor signal
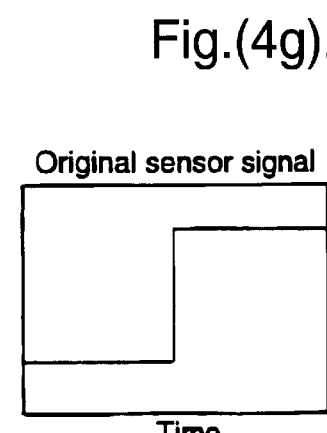
Time

Fig.(4i). Modified reference signal
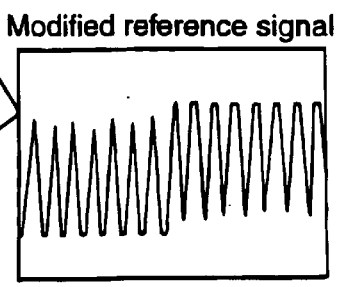
Time

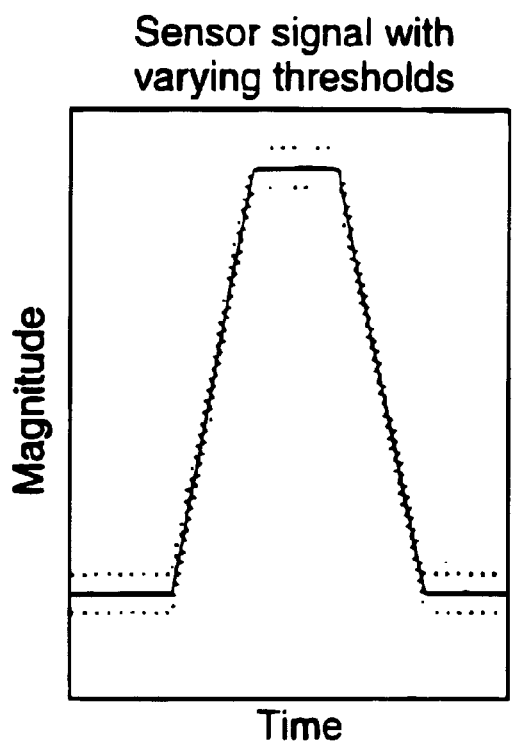
Fig.(5a).
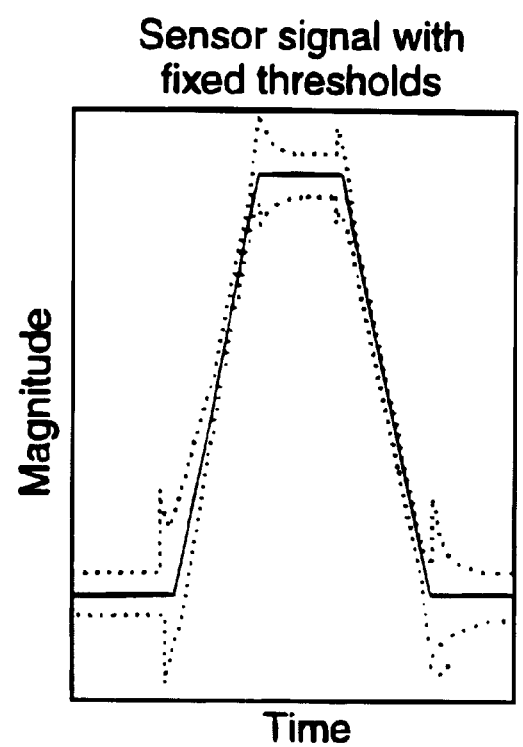
Fig.(5a).

SENSOR FAULT DETECTION SYSTEM

This is a continuation of PCT application No. PCT/GB96/01596, filed Jul. 4, 1996.

BACKGROUND OF THE INVENTION

1. Field of the Invention

This invention relates to an improved system for detecting sensor faults in systems which rely on sensors for monitoring and control purposes. An example of this is the detection of faults in sensors used to control gas turbine engines.

2. Discussion of Prior Art

Sensors which measure gas turbine engine parameters have been shown to be one of the most fault prone components in such engine control systems. Attempts to improve sensor integrity have concentrated on maintaining correct sensor readings, even in the event of one or more sensor faults. It is known in the art to overcome the problem of sensor faults by doubling or even trebling the number of sensors. This duplication of components is referred to as "hardware redundancy", which means that if a fault arises in one of the sensors, its presence is indicated by virtue of the two sensor signals being dissimilar. Although this method is widely used, it is not only costly, but more importantly in aerospace applications, results in extra weight of the sensors and associated electronics.

To avoid these disadvantages, "analytical redundancy" has been studied as a means of reducing the number of sensors whilst still retaining the required degree of integrity. Analytical redundancy detects the presence of a sensor fault by comparing the sensor reading with a reference signal provided by a software model for example, rather than from a duplicate sensor. Such software models must accurately follow the characteristics of the system being monitored or controlled, and must be able to run in real time. Most model-based systems use some sort of observer or Kalman filter to continuously correct the reference states, using information from the engine sensors, such that they mirror the actual outputs.

Once the reference outputs are obtained they are subtracted from the actual sensor outputs. The difference between these two signals is often referred to as the residual signal. In prior art fault detection systems which use this method, a fault is declared if the residual exceeds a prescribed threshold value; if no faults are present, the residual signal would ideally be zero.

In most applications, however, it is impossible to obtain a model of a complicated system such as a gas turbine engine which can run in real time and which still matches the system sensor outputs over the system's entire operating range. This is especially true when sensor noise is taken into consideration. Filtering can help reduce noise but will not entirely eliminate it. In practice, therefore, allowance must be made for the fact that the amplitude of the reference outputs will always be different from the amplitude of the sensor outputs.

Methods which only compare the amplitude of the engine and reference outputs are very susceptible to modelling errors. When a system is in steady state, modelling errors will cause d.c. biases between the system and reference outputs. These biases will not only vary under different operating conditions of the engine but also between different systems of the same type. Prior art fault detection systems which compare the difference in amplitudes between system and reference outputs generate residual signals which are at least as large as these d.c. biases and so the fault detection thresholds have to be increased accordingly. This in turn means that only faults which are larger than these d.c. biases can be detected. Another problem is that the dynamic modelling errors are usually larger than the steady state errors. This means that during engine manoeuvres where the engine state is changing rapidly, the sensor fault detection thresholds have to be increased. Because of these problems it has been difficult to determine effective threshold values which allow differences in signals due to small faults to be distinguished from those arising from modelling errors, noise and d.c. biases. This often results in sensor faults being wrongly declared. Practical application of the above techniques has therefore been largely confined to the detection of large, catastrophic faults.

UK patent application GB 212156A describes a method for detecting errors in a control system by comparing model and actual outputs from the system. Error signals above a pre-set deadband are integrated and a fault signal is generated if the integral exceeds a pre-set value. The integral is set to zero when the discrepency dissappears. Although this helps to show slow incipient errors, problems remain. Firstly one has to choose the appropriate deadband which is often a "hit or miss" exercise because many modelling errors or d.c. biases which may occur are indeterminate, especially when one considers that each sensor is different. Another problem concerns scaling; both reference and actual signals have to be of the same scale otherwise the integral method will always register a fault.

The problem with such systems are that when the system is running at as steady state, the only characteristics of the sensor and artificial reference signals will be due to noise which will be different for both signals, often causing a faults to be erroneously indicated.

SUMMARY OF THE INVENTION

It is therefore an object of the invention to provide a sensor fault detection system which overcomes these problems.

According to the invention is provided a method of detecting sensor faults in a system having at least one sensor for monitoring or controlling system parameters, the method comprising the following steps:

(a) generating reference sensor signals of the system;

(b) recording the value of the or each sensor signal and the corresponding reference sensor signals at regular intervals;

(c) comparing the shape characteristics of a series of values of the or each sensor signal with the shape characteristics of a series of corresponding modified reference signals by means of a correlation coefficient;

(d) continuously updating the respective series of signals with the most recent values, and;

(e) declaring a fault when the correlation coefficient fails outside a prescribed range, characterised in that the modified reference signal is generated by:

(f) multiplying the reference signal by a scaling factor to convert the or each sensor signal and its corresponding reference signal (g) calculating the mean values of the or each sensor signal and its corresponding reference signal;

(h) subtracting the respective mean values from the or each sensor signal and its corresponding reference signal to obtain new values for the or each sensor signal and its corresponding reference signal;

(i) applying deviation thresholds to either side of the new values for the or each sensor signal;

(j) superimposing the value of the or each reference signal over the thresholds around the new value of its corresponding sensor signal, and (k) formulating a modified reference signal from a hybrid of values of the new sensor signal and the new reference signal.

It is a further object of the invention to provide a sensor fault detection method which is insensitive to unmeasured disturbances acting on the system. These unmeasured disturbances are in effect inputs which, in an open loop system, will affect the system output but not reference outputs. In the case of aero engines for example, unmeasured disturbances would be typified by power off-take or bleed. Power off-take describes the process by which power is drawn from the engine to supply energy for various airborne systems such as to actuate control surfaces. The magnitude of these disturbances is unmeasured and therefore unknown. In a closed loop control system engine output are fed back to provide information to the model. The effects of unmeasured disturbances on the system outputs and reference outputs will generally be different. Compensation for the effects of unmeasured disturbances is performed according to an aspect of the invention by detecting the level of such unmeasured disturbances and by incorporating an additional model of these to allow correction factors to be applied to the reference outputs used in the comparison stage.

BRIEF DESCRIPTION OF THE DRAWINGS

The invention will now be described by way of example only with reference to the following figures of which:

FIGS. 2(a)–2(h) show diagrammatic representation of the generation of a modified reference signal which is preferably compared with the actual sensor signal.

FIG. 3 and FIGS. 3(a) to 3(d) shows a problem of detecting step faults in the one of the embodiments of the invention.

FIG. 4(a)–4(i) show how the problem described in FIG. 3 is overcome by a further refinement FIG. 5(a)–5(b) show sensor signals onto which fixed or varying thresholds may be added.

DETAILED DISCUSSION OF PREFERRED EMBODIMENTS

Figure 1:
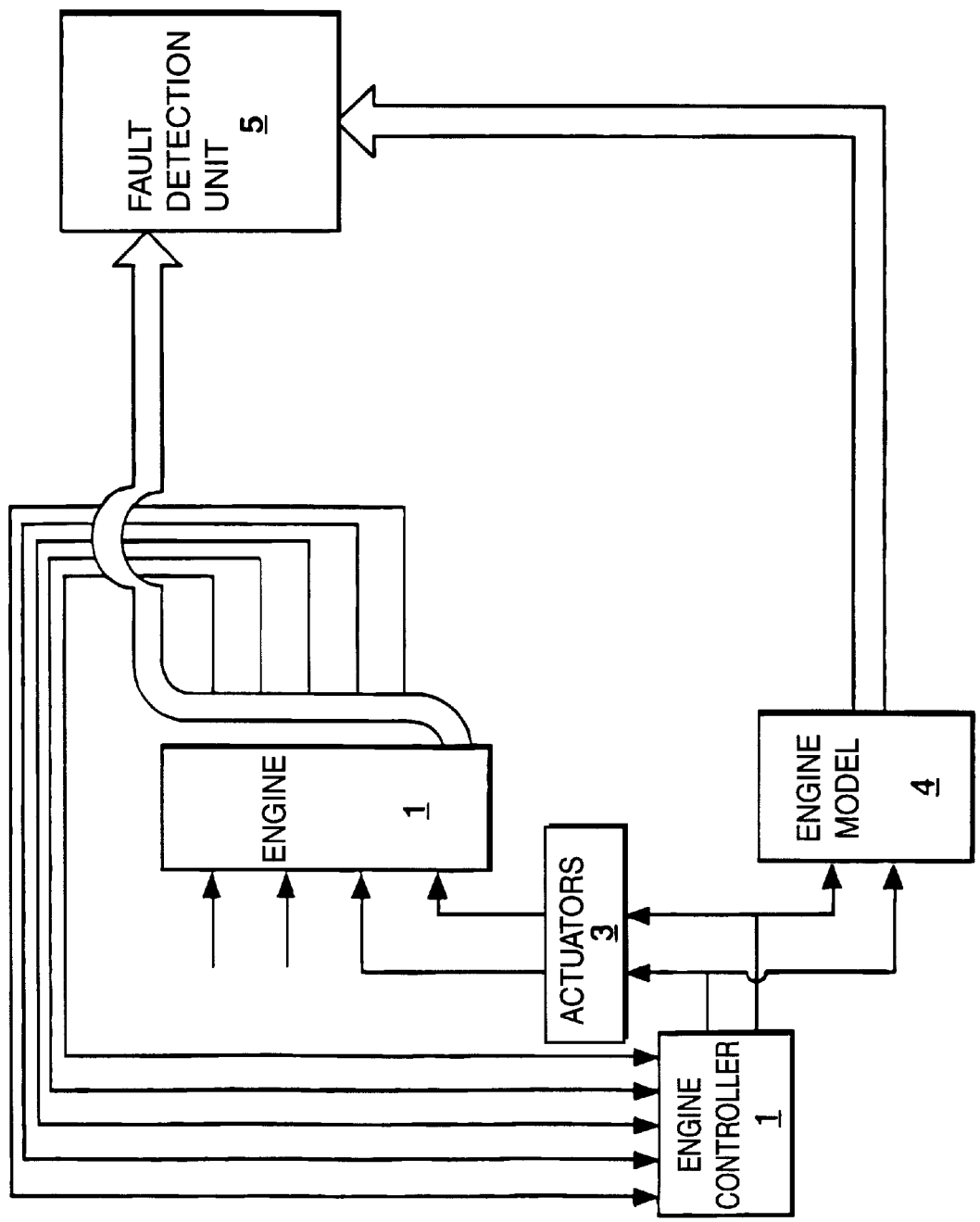
FIG. 1 shows in block diagram form an arrangement of the sensor fault detection system.

FIG. 1 shows an embodiment of the sensor fault detector applied to an aero-engine. The complete system comprises the aero-engine (1) which is to be monitored and controlled and to which various sensors are fitted for measuring parameters such as high pressure spool speed, low pressure spool speed, high pressure compressor temperature, high pressure compressor pressure etc. Some of the signals from these sensors, including low and high pressure spool speeds, are input into an engine controller (2). In addition, the engine controller has three inputs arising from outside manual control: fuel flow, nozzle area and intermediate pressure blow-off valve position. The engine controller dictates the operating conditions of the engine by giving signals to actuators (3) which act on the engine. The engine controller signals are also delivered to an engine model (4) which is a software model of the engine characteristics. This engine model provides reference signal values, these being determined by the operating conditions of the engine. The general arrangement described thus far is known from prior art systems. It is in the final unit, fault detection unit (5), that the invention is embodied. The fault detection unit (5) receives all the outputs from actual engine sensors as well as the corresponding reference signals provided by the engine model. This unit is used to compare actual engine sensor output signals with corresponding reference signals.

The sensor fault detector according to the invention detects the presence of a sensor fault by comparing the shapes of the actual sensor signals and those provided by the reference signal. Comparing shapes eliminates any complications that would otherwise be encountered where the reference sensor signal is differently scaled or may have a different offset value from the actual sensor value. Shapes are compared by comparing values of actual and reference sensor signals over a period of time, the so-called time window, the duration of which is chosen to suit requirements. This is achieved according to the invention by taking samples of the actual and reference sensor signals at time intervals and analysing the differences in shape characteristics of the last 2 or more samples in order to determine the degree of similarity/difference between the actual and reference sensor signals. This is done by calculation of a correlation coefficient which determines whether a sensor fault is to be declared.

The time window extends from the time when the last pair of values is sampled to a preset time beforehand, all sampled values within this time window being used for shape comparison purposes. Using the most recent values means that the fault detection system may be run in "real time" and allows faults to be detected quickly. In other words, the values of the last N samples of reference and actual sensor signals are used for comparison purposes, where N can be 2 or more. If, for example, the time window chosen is 10 seconds and samples of the actual and reference sensor signals are taken every 0.1 seconds, then the last 100 sample pairs are used to perform the comparison exercise. After each comparison, i.e. after every 0.1 seconds, new samples of the actual and reference sensor values are taken and the oldest pair of reference and signal values is rejected from the set of samples used for shape comparison.

The correlation coefficient is used as a measure of how similar the shapes are and is preferably calculated using the formula below:

$$\text{Correlation coefficient} = \frac{\sum_{n=1}^{N}(x_n - \bar{x})(y_n - \bar{y})}{\sqrt{\sum_{n=1}^{N}(x_n - \bar{x})^2 \sum_{n=1}^{N}(y_n - \bar{y})^2}}$$

Where x is the nth sample of the sensor signal;

y the nth sample of the reference signal;

x̄ is the mean value of the sensor signal taken over N samples.

ȳ is the mean value of the reference signal taken over N samples.

Not all the samples of the reference and sensor signals are used but only the latest N samples, extending along the chosen time window, As each new sample is taken the oldest sample is deleted and the correlation coefficient is recalculated.

The correlation coefficient calculated from the above equation will always lie between −1 and +1. This value is then squared to give a revised correlation coefficient such that the value thereof lies between zero and 1. If both the sensor and reference signal have exactly the same shape then the revised correlation coefficient will be unity and as the shapes become more and more dissimilar the revised correlation coefficient drops to zero. In this embodiment, the sensor is declared to be faulty if the revised correlation coefficient falls below a predetermined value e.g. 0.95.

The above equation for the correlation coefficient in a preferred embodiment is modified to prevent any possible system crash by division by zero. This situation would occur if either of the reference or sensor signals remain exactly constant; the denominator of the above equation would be zero. An alternative correlation coefficient which overcomes this problem is shown below:

$$\text{Correlation coefficient} = \frac{\sum_{n=1}^{N}(x_n - x)(y_n - y)}{\sqrt{\sum_{n=1}^{N}(x_n - x)^2 \sum_{n=1}^{N}(y_n - y)^2 + a}}$$

where a is a constant e.g. 0.001 which ensures the denominator is never zero. x, x, y, y, and N are as before.

As mentioned previously, any d.c. biases between the sensor and reference outputs are ignored by the technique. Because this method uses the sensor and reference signals without simply looking at their differences, large similarities in the shape of the two signals mask any small dissimilarities due to modelling errors. A further advantage of the above method is that the effects of different scaling between actual and reference signals do not affect the result.

A preferred refinement of the technique will now be described. In practice, both the sensor and the reference output signals will be corrupted by noise. When the engine is in steady state the sensor and reference signals will consist of d.c. values plus signal and reference noise. The noise signals are generally uncorrelated and so the correlation coefficient will fall to zero in the case of steady state conditions, indicating that the signal shapes are totally dissimilar and that the sensor is faulty, even though both the sensor and reference signals are behaving in the same manner. Incorporation of a filter is an impractical solution to this problem as it does not eliminate noise completely and it would also introduce time delays.

The way in which a preferred refinement of the invention overcomes this problem is by generating a modified reference signal which is then compared with the actual sensor signal by means of a correlation coefficient. The modified reference is made to only differ from the sensor signal by the amount by which the reference signal lies outside the thresholds applied to the sensor signal. The modified reference signal is produced by the following steps: Firstly the actual sensor signal is taken and deviation thresholds are either side of it These sensor deviation threshold levels are then applied to the reference signal. Those portions of the reference signal which lie outside the deviation thresholds have the threshold value subtracted from them if the reference signal lies above the threshold or added to it if it lies below the threshold. The portion of the reference signal which lies within the signal deviation thresholds is substituted with the sensor signal values. In this way a modified (hybrid) reference signal is produced which only differs from the sensor signal by the amount by which the model signal lies outside the thresholds. The modified reference signal thus obtained is the same as the actual sensor signal only when the variations between the actual and reference signals are small (due to noise). When the signals are undergoing larger magnitude changes e.g. due to a sensor fault, the modified reference signal is the same as the parent reference signal, except that the deviation thresholds are removed or added. The modified reference signal, which is in effect a hybrid of the actual sensor and reference signals, is then compared with the original sensor signal.

FIG. 2 shows in more detail how this is implemented. FIG. 2a shows an example of a sensor signal, and FIG. 2b shows the corresponding reference signal. Both signals are shown over a prescribed time window of 500 seconds. Firstly, the mean values are subtracted from the original sensor signal and the parent reference signal to produce two new signals, FIGS. 2c and 2d. Prescribed threshold levels are placed on either side of the new sensor signal, shown in FIG. 2e by broken lines. These threshold values are chosen to suit the requirements of the sensor fault detection system. The same threshold curves are then applied against the reference signal, as shown in FIG. 2f. This determines which portions of the reference signal are to be replaced with the sensor signal. Every portion of the reference signal which lies within these threshold limits is regarded as being the same as the sensor signal, but where the reference signal falls outside the thresholds it is regarded as being different from the example sensor signal by the amount which it falls outside the thresholds. A modified reference signal 2h is thus generated which is a hybrid of the sensor signal and the reference signal (with the threshold value added or subtracted), in which the sensor signal is replaced with the reference signal in those portions where the reference signal values exceed the sensor signal thresholds. The new hybrid signal is then correlated with the original sensor signal to assess sensor reliability. The threshold levels can be chosen to suit requirements, but in any case should be larger than the amplitude of the noise.

The above method prevents the correlation coefficient from falling due to noise in steady state operation. However this adversely affects the detection of step faults. The reason for this is illustrated in FIG. 3, in which the engine is running at a constant operating condition and therefore the reference signal is constant (FIG. 3b), and a step fault suddenly appears on the sensor signals (FIG. 3c). The reference signal will remain constant and always lies outside the sensor signal thresholds (FIG. 3a). The modified reference signal thus is made to differ from the sensor signal by the amount in which the reference signal lies outside the sensor signal thresholds. In this way the modified sensor signal (FIG. 3d) comprises a small step equal to twice the threshold value. The modified reference and sensor signals are now both the same shape and so produce a perfect correlation even though a fault is present.

In order to prevent this situation two preferred modifications can be incorporated as explained hereinafter. The first is simply to produce the modified reference signal by the same steps as above except that where the reference signal lies outside the sensor signal thresholds, the modified reference signal comprises the reference signal without any threshold values added or subtracted.

This simplification is not ideal in all situations. The reason why when the reference signal lies outside the sensor signal threshold, the modified reference signal is made up of the reference signal minus or plus the threshold value is because it is preferred to ignore any difference between the sensor and reference signals which is less than or equal to the threshold value, not just when the reference signal lies within the sensor signal thresholds.

A second preferred alternative will now be described which overcomes a problem of undesired correlation of step faults, by means of scaling up the signal with the smallest area, and which is described with reference to FIG. 4. Thresholds are applied to the sensor signal which, in the example a step fault, as described before (FIG. 4a). The reference signal which in the example is a continuous level, is assumed comprise a noise signal but if felt that the noise signal is too small in order to calculate an area, a dither signal (small triangular waveform) can be applied to the reference signal (FIG. 4b). The next step is to calculate the areas of the sensor signal and reference signal (FIGS. 4c and 4d respectively). The signal with the smallest area is then scaled up by the ratio of the largest area to the smallest area (FIG. 4f). In this example the reference signal is scaled up by this ratio. This scaled up reference signal is then superposed on the sensor signal deviation threshold values as described before. For the time that the scaled reference signal lies within the sensor signal thresholds the modified reference signal comprises the sensor signal and where the scaled reference signal lies outside the sensor signal thresholds, the modified reference signal comprises the scaled reference signals with the threshold value either added or subtracted such that the modified reference signal only differs from the sensor signal by the amount by which the scaled reference signal lies outside the deviation thresholds. The modified reference signal (FIG. 4i) is then correlated as described before with the sensor signal (FIG. 4h) and a correlation coefficient determined.

FIG. 5 shows yet a further enhancement of the invention whereby the magnitude of the threshold values placed around the sensor signal are allowed to vary in order to compensate for increased modelling errors during transient behaviour. Some differences between engine and model may be due to time delays e.g. which are large relative to steady state errors. FIG. 5a shows how the thresholds applied to the sensor signal may vary. The magnitude of the increase in the thresholds may be determined buy factors such as size and rate of change of the signal . In the example once the thresholds have been increased at the beginning and end of a transient they are then allowed to decrease back to their normal values in an exponential fashion.

Figure 6:
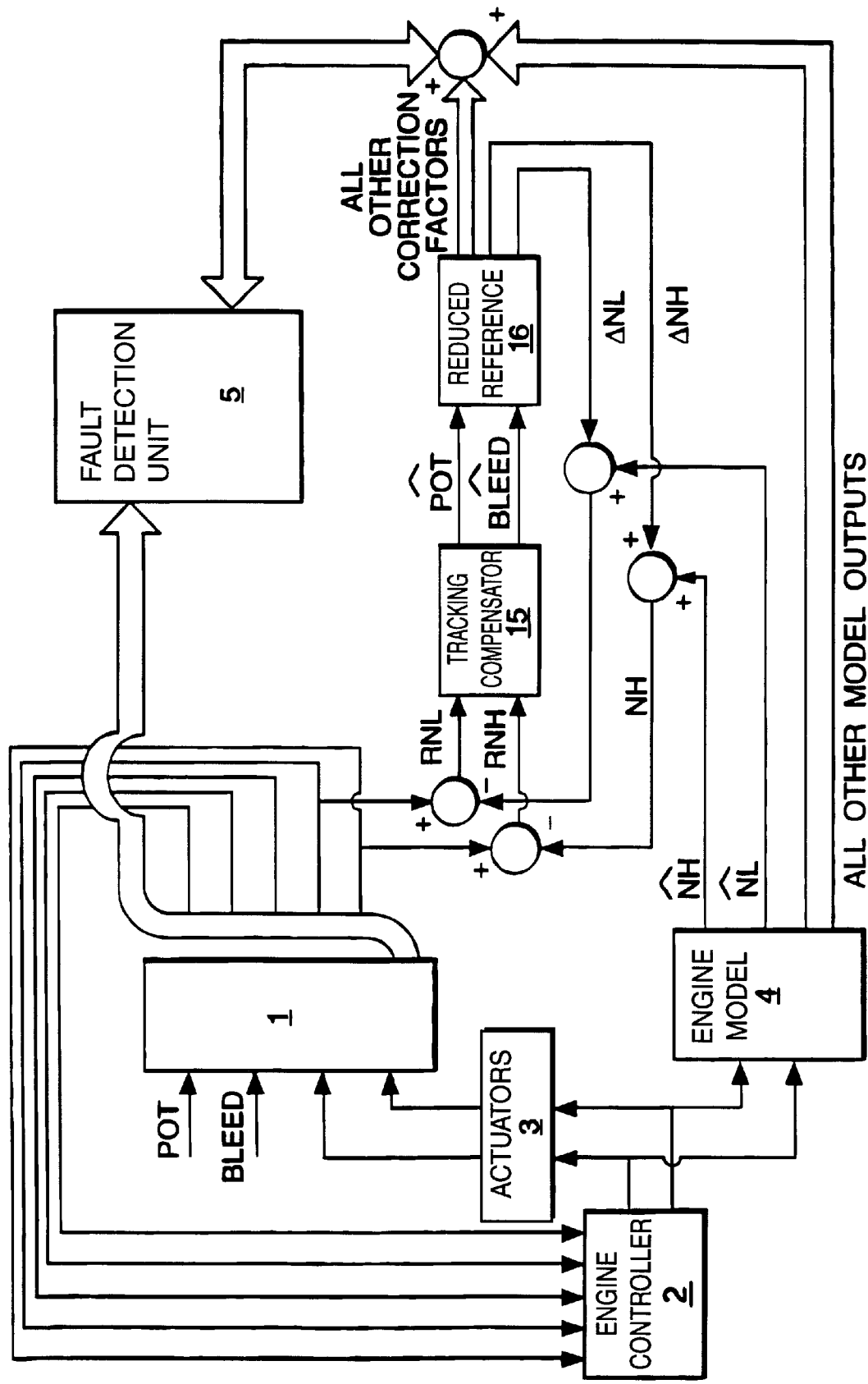
FIG. 6 shows a block diagram of the sensor fault detector configured to compensate for conditions when unmeasured disturbances are acting.

FIG. 6 shows a further embodiment in which the fault detection system is additionally configured to compensate for two conditions of unmeasured disturbance, namely power off-take and service bleed. For each unmeasured disturbance for which compensation is required, a sensor output is taken in order to determine the level of disturbance. The complete system comprises the engine (1), the engine controller (2), actuators (3) and the engine model (4) as before. In the embodiment described here, two additional modules are included: a tracking compensator (15) and a reduced reference (16). The reason for these two extra modules is to accommodate for conditions when the unmeasured disturbances are acting. The function provided by the final two modules is to ensure that perturbations of the engine outputs caused by variations in power off-take and service bleed are mirrored by similar correction factors added to the reference outputs. This is done by taking two of the sensor outputs which respond differently to power off-take and service bleed and forcing the corresponding engine reference outputs to track these signals.

In the example which follows, the two sensor signals which are used to compensate for unmeasured disturbances are high pressure spool speed and low pressure spool speed, respectively designated as NH and NL in the text which follows. The reference signals of these two sensor signals (designated NH and NL) are corrected by the addition of correction factors NH and NL via summing junctions 7 and 8 respectively. The actual sensor outputs NH and NL are compared with these corrected values at junctions 9 and 10 and the differences between them (the residual signals RNH and RNL) are fed into a tracking compensator 15. Levels of power off-take (POT) and service bleed (BLEED) are calculated by the tracking compensator and fed into a reduced model 16.

The reduced model is a software model having information on the characteristics of the two unmeasured disturbances at various operating conditions. It is a two state model which models the effects of power off-take and service bleed on all the outputs of interest. In order to produce this software model, the dynamic responses of the engine to the two unmeasured disturbances applied individually to a number of running conditions must be identified. Correction factors are then computed which are added to the reference outputs via junction 11, such that they reflect the true output values. The corrected reference signal outputs are then fed into the fault detection system 5 where they are compared with the actual output signals. Correction factors NH and NL are also output from the reduced reference and added to the original reference signals at junctions 7 and 8 as described previously.

The above solution assumes that the NH and NL sensor outputs are correct and not prone to faults themselves. If either of them were faulty then incorrect estimates of power off-take and bleed would be obtained and this would affect all the other reference outputs, possibly causing faults to be flagged erroneously on all the sensors. It is therefore a requirement that the sensors used to determine levels of unmeasured disturbances are high integrity and do not suffer from faults themselves. They may therefore have to be duplicated or even triplicated to provide the required degree of confidence. Although this increases cost of these particular sensors, overall savings result by removing hardware redundancy from other areas.

Although in the embodiment described here the sensor fault detection system is configured to compensate for the effects of two kinds of unmeasured disturbance, it will be clear to persons skilled in the art that the invention may be extended to compensate for any number of unmeasured disturbances. This can be achieved if the reduced model incorporates the characteristics of the unmeasured disturbance and its effects on all the other sensor values at all operating points. For each type of unmeasured disturbance one actual sensor signal and the corresponding reference signal needs to be taken to provide estimates of the unmeasured disturbance acting.

It is a requirement that the sensors used to estimate unmeasured disturbances respond differently to the different kinds of unmeasured for which compensation is required. If the sensors respond in an identical manner to the different kinds of unmeasured disturbance, it is not possible to detect which type of disturbance is acting. In practice, where compensation is required for two types of unmeasured disturbance, it is unlikely that the two chosen sensors, which measure different engine parameters, will respond in an identical fashion to both kinds of unmeasured disturbance . A knowledge of the control system and the particular unmeasured disturbance should enable a person skilled in the art to identify two suitable sensors.

Although the present invention has been described in terms of a sensor fault detection system for use in a control system of a gas turbine engine it will be appreciated by those skilled in the art that the sensor fault detection system can be applied to any system which possesses sensors for monitoring, measuring or control purposes.

I claim:

1. A method of detecting sensor faults in a system having at least one sensor providing a sensor signal for monitoring or controlling system parameters, the method comprising the following steps:

(a) generating reference signals of the system;

(b) recording the value of each sensor signal and the corresponding reference signals at time intervals;

(c) comparing the shape of an outline formed from a series of values of each sensor signal with the shape of an outline formed from a series of corresponding modified reference signals by means of a correlation coefficient;

(d) continuously updating the respective series of signals with the most recent values and (e) declaring a fault when the correlation coefficient falls outside a prescribed range, wherein the modified reference signal is generated by:

(f) multiplying the reference signal by a scaling factor to convert each sensor signal and its corresponding reference signal;

(g) calculating the mean values of each sensor signal and its corresponding reference signal;

(h) subtracting the respective mean values from each sensor signal and its corresponding reference signal to obtain new values for each sensor signal and its corresponding reference signal;

(i) applying deviation thresholds to either side of the new values for each sensor signal;

(j) superimposing the value of each reference signal over the thresholds around the new value of its corresponding sensor signal, and (k) formulating a modified reference signal from a hybrid of values of the new sensor signal and the new reference signal.

2. A method of detecting sensor faults in a system having at least one sensor providing a sensor signal for monitoring or controlling system parameters, the method comprising the following steps:

(a) generating reference sensor signals of the system;

(b) recording the value of each sensor signal and the corresponding reference sensor signals at regular intervals;

(c) comparing the shape characteristics of a series of values of each sensor signal with the shape characteristics of a series of corresponding modified reference signals by means of a correlation coefficient;

(d) continuously updating the respective series of signals with the most recent values and (e) declaring a fault when the correlation coefficient falls outside a prescribed range, wherein the modified reference signal is generated by:

(f) multiplying the reference signal by a scaling factor to convert each sensor signal and its corresponding reference signal;

(g) calculating the mean values of each sensor signal and its corresponding reference signal;

(h) subtracting the respective mean values from each sensor signal and its corresponding reference signal to obtain new values for each sensor signal and its corresponding reference signal;

(i) applying deviation thresholds to either side of the new values for each sensor signal;

(j) superimposing the value of each reference signal over the thresholds around the new value of its corresponding sensor signal, and (k) formulating a modified reference signal from a hybrid of values of the new sensor signal and the new reference signal, wherein said correlation coefficient is of the form $$\text{Correlation coefficient} = \frac{\sum_{n=1}^{N}(x_n - x)(y_n - y)}{\sqrt{\sum_{n=1}^{N}(x_n - x)^2 \sum_{n=1}^{N}(y_n - y)^2}}$$

Where $x_n$ is the nth sample of the sensor signal;

$y_n$ the nth sample of the reference signal;

x is the mean value of the sensor signal taken over N samples and y is the mean value of the reference signal taken over N samples.

3. A method of detecting sensor faults in a system having at least one sensor providing a sensor signal for monitoring or controlling system parameters, the method comprising the following steps:

(a) generating reference sensor signals of the system;

(b) recording the value of each sensor signal and the corresponding reference sensor signals at regular intervals;

(c) comparing the shape characteristics of a series of values of each sensor signal with the shape characteristics of a series of corresponding modified reference signals by means of a correlation coefficient;

(d) continuously updating the respective series of signals with the most recent values and (e) declaring a fault when the correlation coefficient falls outside a prescribed range, wherein the modified reference signal is generated by:

(f) multiplying the reference signal by a scaling factor to convert each sensor signal and its corresponding reference signal;

(g) calculating the mean values of each sensor signal and its corresponding reference signal;

(h) subtracting the respective mean values from each sensor signal and its corresponding reference signal to obtain new values for each sensor signal and its corresponding reference signal;

(i) applying deviation thresholds to either side of the new values for each sensor signal;

(j) superimposing the value of each reference signal over the thresholds around the new value of its corresponding sensor signal, and (k) formulating a modified reference signal from a hybrid of values of the new sensor signal and the new reference signal, wherein said correlate coefficient is of the form $$\text{Correlation coefficient} = \frac{\sum_{n=1}^{N}(x_n - x)(y_n - y)}{\sqrt{\sum_{n=1}^{N}(x_n - x)^2 \sum_{n=1}^{N}(y_n - y)^2 + a}}$$

Where $x_n$ is the nth sample of the sensor signal;

$y_n$ the nth sample of the reference signal;

x is the mean-value of the sensor signal taken over N samples and y is the mean value of the reference signal taken over N samples a is a constant.

4. A method of detecting sensor faults as claimed in claim 1 wherein in step (k) the modified reference signal comprises values of the new sensor signal where the new reference signal fails within said deviation thresholds, and those values of the new reference signal itself where the new reference signal fails outside said deviation thresholds.

5. A method of detecting sensor faults as claimed in claim 4 wherein in step (k) the modified reference comprises the new sensor signal values when the new reference signal lies within said deviation thresholds and comprising the new reference signal with the deviation threshold value added or subtracted therefrom when the new reference signal lies outside said deviation thresholds, such that the modified reference signal only differs from the sensor signal by the amount the new reference signal lies outside the deviation thresholds.

6. A method of detecting sensor faults as claimed in claim 1 comprising the additional step between steps (h) and (i) of calculating the areas under the new reference signal and new sensor signal and scaling that signal of them with smallest area by the ratio of the largest area to the smallest area.

7. A method for detecting sensor faults as claimed in claim 6 comprising the additional step of applying a dither signal to the either the new reference signal or the new sensor signal.

8. A method of detecting sensor faults as claimed in claim 1 wherein the deviation thresholds are allowed to vary in magnitude during operation of sensor fault detection.

\* \* \* \* \*